United States Patent [19]

Morander

[11] Patent Number: 4,548,504
[45] Date of Patent: Oct. 22, 1985

[54] DEVICE FOR DETERMINING THE REAL OR THE VIRTUAL DISTANCE OF A SOURCE OF LIGHT FROM A MEASURING PLANE

[76] Inventor: Karl-Erik Morander, P. O. Box 2025, S-443 02 Lerum, Sweden

[21] Appl. No.: 401,418

[22] Filed: Jul. 23, 1982

[30] Foreign Application Priority Data

Aug. 11, 1981 [EP] European Pat. Off. ........ 81106262.9

[51] Int. Cl.[4] ............... G01B 11/24; G01N 21/57
[52] U.S. Cl. .............................. 356/375; 356/376; 250/211 K
[58] Field of Search ............ 356/373, 375, 376, 9, 356/4, 446; 250/227, 211 K, 578

[56] References Cited

U.S. PATENT DOCUMENTS

| | | | |
|---|---|---|---|
| 3,523,731 | 8/1970 | Mary | 356/4 |
| 3,746,864 | 7/1973 | Tick et al. | 250/205 |
| 3,806,256 | 4/1974 | Ishak | 356/446 |
| 3,832,065 | 8/1974 | Sullivan et al. | 356/446 |
| 3,918,814 | 11/1975 | Weiger | 356/375 |
| 4,226,536 | 10/1980 | Dreyfus et al. | 356/376 |
| 4,299,496 | 11/1981 | Lord | 356/376 |
| 4,373,804 | 2/1983 | Pryor et al. | 356/376 |
| 4,412,746 | 11/1983 | Yokouchi | 250/227 |

*Primary Examiner*—R. A. Rosenberger
*Attorney, Agent, or Firm*—Wood, Dalton, Phillips, Mason & Rowe

[57] ABSTRACT

The invention relates to a device for determining the real or the virtual distance of a source of light from a measuring plane. Such devices are preferably employed in position detectors in which light produced by a light source is caused to impinge on the surface of the object to be measured, said light being reflected from said surface towards a photodetector. The light emitted by the light source is imaged at different points on said detector, this depending on the position of the surface of the object to be measured, it thus being possible to draw a conclusion as regards the position of said object. According to the invention, the imaging system and the position-sensitive detector form a rotationally symmetrical arrangement. This renders the function of the device independent of any lateral displacement of the light source, of a displacement of the "center of gravity of illumination" as caused by different degrees of reflexion or scattering produced by the surface of the object to be investigated, and of the shape of the surface of the object to be investigated.

8 Claims, 15 Drawing Figures

DEVICE FOR DETERMINING THE REAL OR THE VIRTUAL DISTANCE OF A SOURCE OF LIGHT FROM A MEASURING PLANE

TECHNICAL FIELD OF THE INVENTION

The invention relates to a device for determining the real or virtual distance of a source of light from a measuring plane comprising an optical imaging system adapted to image onto a photosensitive detector, light emitted by source of light.

BRIEF DESCRIPTION OF THE PRIOR ART

A device of this kind in which position-sensitive photodetectors are employed has been disclosed in DE-OS 26 17 797. Such devices are employed in the industry particularly for measuring objects in a contact-free manner, e.g. for the purpose of determining the position or the thickness of an object.

In such a device, a beam of light is caused to impinge on a surface of the object to be investigated. The light which is reflected or backscattered at the point of impingement is imaged by means of a lens on a position-sensitive photodetector. Upon the position of the object in relation to the measuring device being changed, the backscattered or reflected light is imaged by the lens at another point on the position-sensitive photodetector. This change is converted into a change in the indication provided by the device.

It is a feature which all these devices have in common that the light beam projected onto the object and thus the beam spot visible on its surface has a relatively large surface area as compared to the measuring range. Such a relatively large area may also be the result of the fact that the light beam penetrates the surface of the material under test and that it is scattered within the material. When the light impinges on a surface which is not uniform, individual portions of this illuminated spot will produce differing degrees of reflexion or scattering. The illuminated area is imaged on the position-sensitive detector. The currents occurring at the detector will then be proportional to the "centre of gravity of illumination" of the beam spot and to the total amount of light energy impinging on the object. Any non-uniform reflexion caused by individual parts of the illuminated spot will cause said "centre of gravity of illumination" to be displaced in relation to its ideal position, this resulting in an inaccurate indication of position provided by the photo-sensitive detector. Such inaccuracies will become the larger the more non-uniform the illuminated surface of the object and the larger the diameter of the beam spot is.

It is another disadvantage of the hitherto known optical position detectors that a displacement of the "centre of gravity of illumination" caused by variation in the degree of reflexion or scattering occurring within the surface of the object under test may occur in any direction which is perpendicular to the incident beam of light. This displacement of the centre of gravity of illumination results in measuring errors.

OBJECT OF THE INVENTION

In view of the foregoing it is the object of the invention, in conjunction with a device for determining the position of an object with the aid of position-sensitive photodetectors, to provide measures which are adapted to render the indication of said position-sensitive photodetector substantially independent of the surface shape of the object being investigated, of the size of the beam spot projected onto the surface of the object, and of varying reflexion and scattering effects occurring in the surface of the object being investigated.

This object is attained by the provision of the device defined above and characterized in that said optical imaging system and said photo-sensitive detector are constructed in a rotationally symmetrical manner in relation to common axis.

According to the invention, there is provided an optical imaging system adapted to form an image of a source of light on the photo-sensitive detector, said imaging system being of rotationally symmetrical construction as is the photo-sensitive detector. The measuring indication supplied by such an arrangement is independent of any lateral displacement of the incident beam of light that may be present, it is independent of the diameter of the light beam, and it is not affected by varying reflexion or scattering phenomena occurring in the surface of the object being investigated.

Optical imaging may be effected not only by means of lenses which are disposed in rotational symmetry on a circle surrounding the axis of rotational symmetry but also by means of a slit diaphragm having a narrow circular slit.

In another embodiment of the invention, use is made of a torus-shaped lens which is adapted to scan a large area and to produce a focussing effect so that a ring-shaped image is formed on the position-sensitive photodetector.

In another embodiment of the invention it is contemplated to provide in conjunction with a rotationally symmetrical arrangement of the individual lenses or the employment of a torus-shaped lens a position-sensitive photodetector having electrodes which are of annular shape and concentrically arranged. This arrangement is of a rotationally symmetrical nature and makes it possible to dispense with the employment of a large number of discrete detectors disposed on a circular path. In this embodiment, the combination with a torus-shaped lens affords particular advantages.

In order to compensate for possible changes in the intensity of the source of light employed, it is further contemplated to supply the source of light by means of a stabilizing circuit. This also tends to improve the test results.

Devices of the kind considered here are subject to non-linearities for which various causes are responsible. The most important cause resides in the fact that the output signal of the detector is a non-linear function of the distance of the object under investigation. Further causes are to be seen in non-linearities of the detector itself and of the optical system as well as the electronic system. For this reason there is provided in the device of the invention a signal processing circuit which is adapted to compensate for such non-linearities.

In order to render the output signal of the position-sensitive photodetector independent of fluctuations in the intensity of the source of light, the two output signals of the photodetector are supplied to a subtractor and to an adder; in a divider fed by the subtractor and the adder, the output signal of the subtractor is divided by the output signal of the adder. In this manner, the resulting output signal which is available at the divider is rendered independent of the intensity of the incident light. In addition, the electrodes at which the position signal appears may be connected to an impedance converter and/or an amplifier so as to prevent said signal processing circuit from affecting the signal appearing at the electrodes.

In still another embodiment of the invention, the intensity of the source of light is adapted to be modulated. By means of this measure it is possible to prevent fluctuations in background illumination from producing erroneous measuring results. The signal produced by the photo-sensitive detectors also includes a modulated amplitude, the direct voltage level being separated from this signal in a further part of the signal processing circuit. The remaining frequency signal is independent of background illumination.

In still further embodiments of the invention, use is made of a source of light in the form of a laser, particularly a laser diode. The beams emitted by lasers exhibit only a small degree of dispersion so that this measure is adapted still further to improve the measuring accuracy. Besides, it is possible with laser diodes easily to modulate the energy of the emitted light by modulating the operating current.

BRIEF DESCRIPTION OF THE DRAWINGS

The invention may be carried into practice in a number of ways but certain specific embodiments will now be described by way of example with reference to the accompanying drawings, in which.

DETAILED DESCRIPTION OF THE PREFERRED EMBODMENTS OF THE INVENTION

Figure 1:
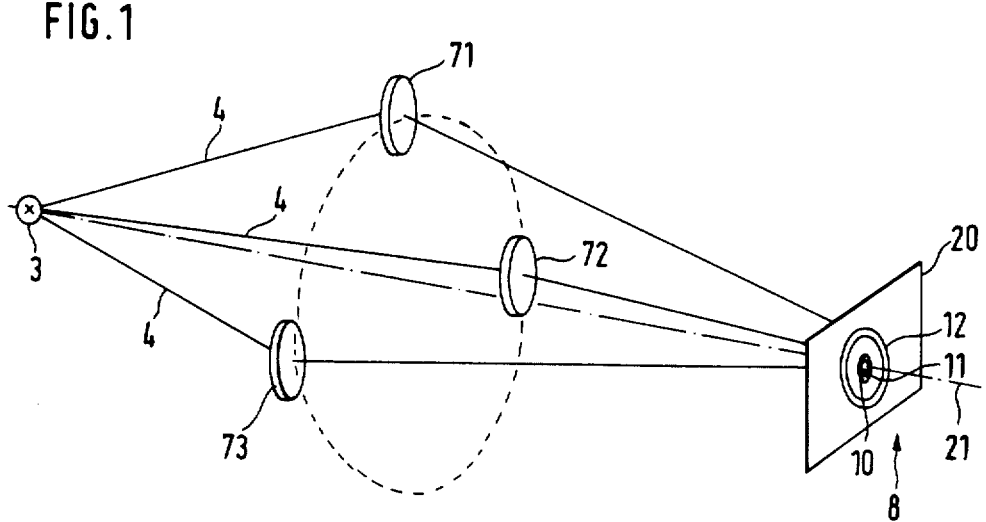
FIG. 1 is a diagrammatic perspective representation of an arrangement adapted to determine the distance of a source of light from a measuring plane, the imaging system being comprised of lenses.

In FIG. 1 there is shown diagrammatically the manner in which, according to the invention, the distance of a source of light 3 from a measuring plane 20 may be determined. The source of light 3 emits rays 4 of light which are projected onto measuring plane 20 by a system comprising three lenses 71, 72 and 73. The three lenses are arranged on a circle. The line connecting the source of light 3 and the centre of said circle constitutes the axis 21 of rotational symmetry. The position-sensitive photodetector is disposed in measuring plane 20. In the embodiment shown in FIG. 1, said photodetector comprises a semiconductor substrate on which two electrodes in the form of concentric rings 11 and 12 are arranged. Upon the source of light 3 being displaced along axis 21 of symmetry, the optical image formed by lenses 71, 72 and 73 is changed in such a way that a different quantity of light impinges on the annular area between electrodes 11 and 12. This produces a change in the conductivity of the photo-sensitive semiconductor substrate extending between electrodes 11 and 12, the result being a change in the indication produced by an indicating instrument.

Figure 2:
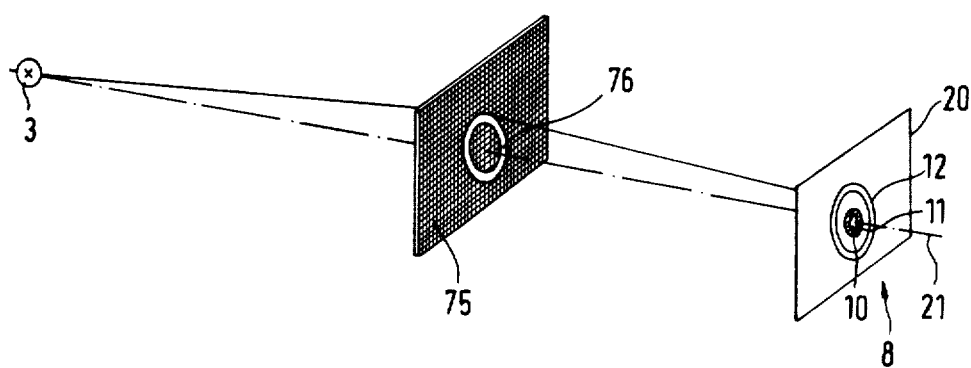
FIG. 2 shows an alternative embodiment comprising an imaging system in the form of a circular slit diaphragm.

Shown in FIG. 2 is another embodiment in which the optical imaging system comprises a slit diaphgram 75 having an annular slit 76. Slit 76 is of small width, e.g. less than 1 mm. Upon source of light 3 being displaced along axis 21, there will occur in the area extending between electrodes 11 and 12 of position-sensitive detector 8 a change in the amount of light received, this being in similarity to the example just described.

The embodiments just described illustrate the determination of the direct distance between source of light 3 and measuring plane 20. If the light emitted by light source 3 does not impinge directly on position-sensitive detector 8 but on a reflecting or scattering surface, from which the light is reflected or scattered in a rearward direction towards the position-sensitive detector, this means that it is not the direct distance between light source 3 and measuring plane 20 that is determined but the distance between the virtual image of the light source and the measuring plane, i.e. the virtual distance which is changed as the distance between the light source and the reflecting surface is changed.

Figure 3:
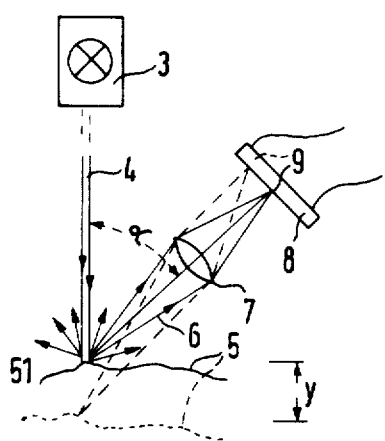
FIG. 3 is a partial view of a single position-sensitive detector and a lens associated therewith, this representation being employed to explain the measuring principle.

FIG. 3 illustrates the principle on which such a known position-sensitive photodetector is based, such a detector also being employed in the present invention. A source of light 3 emits a light beam 4 which impinges on a surface 5 of an object to be measured. Within light spot 51 surface 5 reflects or scatters light. With the aid of scattered light 6, the beam spot 51 is imaged by means of a lens 7 on the surface of a position-sensitive photodetector 8. Upon the object 5 being displaced in the measuring direction which coincides with the direction of the imaging light beam e.g. in a downward direction by distance y, the imaged beam spot 9 will be displaced on the surface of detector 8.

Figure 4:
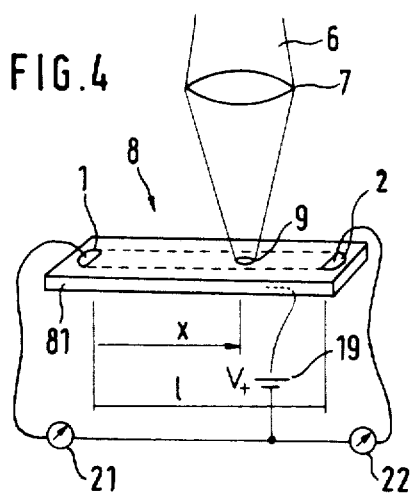
FIG. 4 shows a position-sensitive photodetector.
Figure 5:
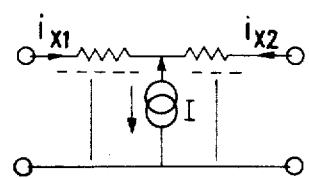
FIG. 5 shows an equivalent circuit representing a position-sensitive photodetector.

The function of a position-sensitive detector is diagrammatically shown in FIG. 4. This detector comprises, for example, a semiconductor substrate 81 having attached thereto two matallic electrodes 1 and 2. By means of lens 7 the reflected or scattered light 6 is imaged to produce a beam spot 9. The light impinging on substrate 81 causes charge carriers to be produced, such charge carriers being caused to be discharged via electrodes 1 and 2 by the voltage of a source 19 connected to the substrate on the one hand and to the electrodes on the other. The currents determined by means of measuring instruments 21 and 22 depend on the distance between the imaged beam spot 9 and the two electrodes. Thus, as shown in FIG. 5, the currents $i_{x1}$ and $i_{x2}$ are a measure of the position of the imaged beam spot 9 and thus give an indication of the position of object surface 5.

Figure 6:
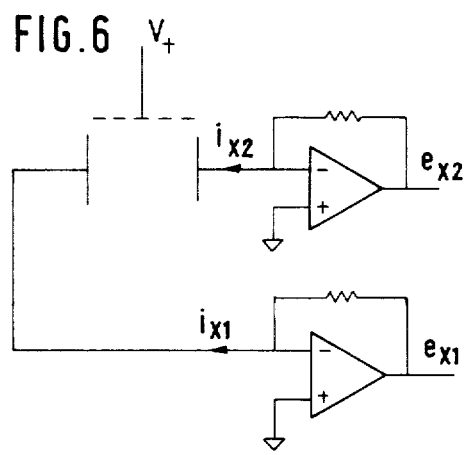
FIG. 6 shows a signal processing circuit for a position-sensitive photodetector.

FIG. 6 shows a circuit which may be connected to electrodes 1 and 2 of such a position-sensitive photodetector. At the outputs of the two operational amplifiers there appear the signals $e_{x1}$ and $e_{x2}$. In the case of this circuit, the equations $e_{x1} = k \cdot x$ and $e_{x2} = k(l-x)$ apply, with l indicating the distance between electrodes 1 and 2, whereas x indicates the distance between the imaged beam spot and electrode 1. From the terms $e_{x1}$ and $e_{x2}$, the position signal $e_x$ is derived. This signal is shown in the following equation:

$$e_x = k \frac{e_{x1} - e_{x2}}{e_{x1} + e_{x2}} = \frac{2(x-l)}{l}$$

Figure 7:
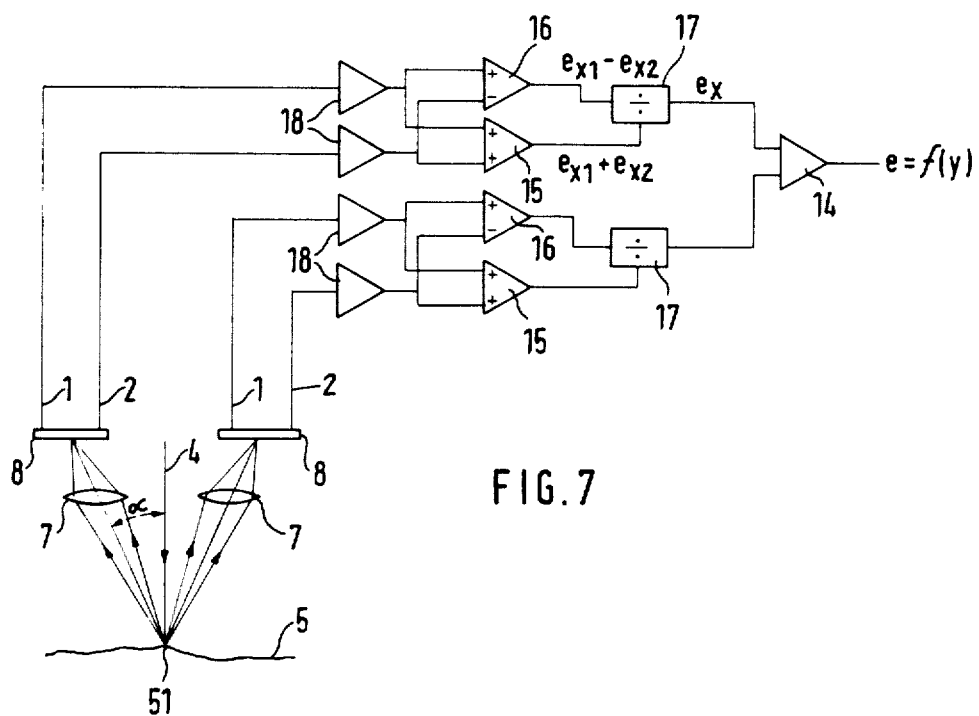
FIG. 7 shows an array comprising two symmetrically arranged position-sensitive detectors according to the invention.

FIG. 7 shows an embodiment of a device according to the invention. Two lenses 7 and their associated position-sensitive photodetectors 8 are symmetrically arranged in relation to the incident light beam 4. The angle α between the axis of light beam 4 and a straight line extending through the point 51 of incidence and the center of the respective lens is kept as small as possible so that the maximum possible intensity of the light imaged on the detector is obtained. Connected to electrodes 1 and 2 of the position-sensitive detectors 8 are amplifiers or impedance converters 18, respectively. The outputs of these amplifiers or impedance converters are connected to adders 15 and subtractors 16, respectively. These subtractors and adders serve to form the signals $e_{x1} - e_{x2}$ and $e_{x1} + e_{x2}$. These output signals are fed to the inputs of a divider 17 producing an output signal corresponding to $$e_x = \frac{e_{x1} - e_{x2}}{e_{x1} + e_{x2}}$$

The two signals $e_x$ produced by dividers 17 are supplied to a signal processing circuit 14 at the output of which there appears a signal e which is a function of the distance y between the surface 5 of the object being measured and the lenses 7 or the position-sensitive detectors 8, respectively.

Figure 8:
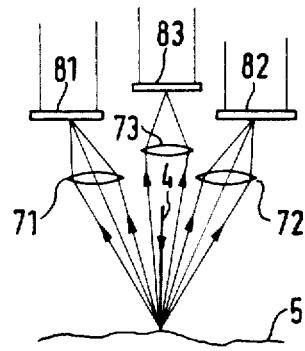
FIG. 8 shows another embodiment comprising a plurality of position-sensitive detectors forming a rotationally symmetrical arrangement.

FIG. 8 shows still another embodiment of the invention which operates principally in the same manner as that shown in FIG. 7. The device comprises three lenses 71, 72 and 73 which are disposed rotationally symmetrical to the incident light beam 4, the angular spacing being, for example, 120°. The three lenses have associated therewith position-sensitive detectors 81, 82 and 83.

Figure 9:
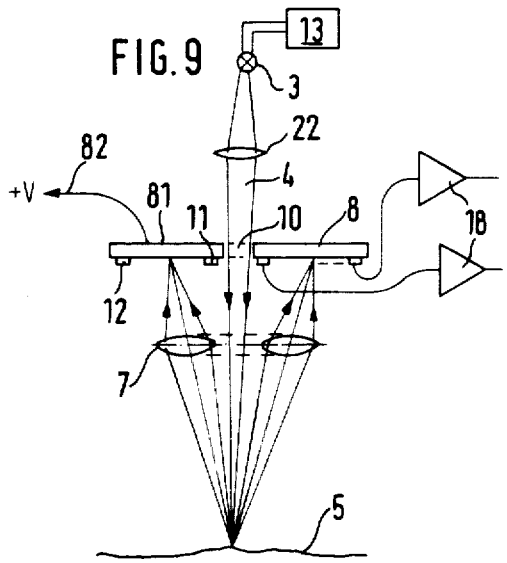
FIG. 9 shows an embodiment comprising a torus-shaped lens and an annular position-sensitive photodetector.
Figure 12:
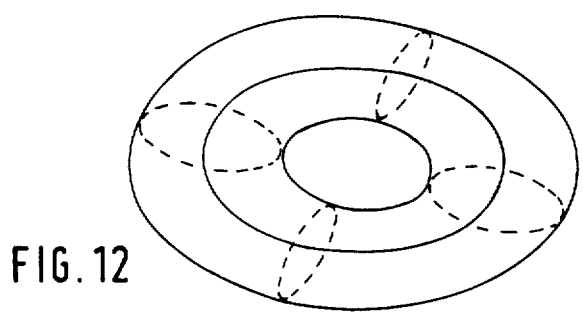
FIG. 12 is a diagrammatic representation of a torus-shaped lens.

A modification of the embodiment of FIG. 8 is shown in FIG. 9. In this case, lens 7 has the shape of a torus. Disposed above lens 7 is a position-sensitive photodetector 8 having the shape of a circular disk. The photodetector comprises an annular inner electrode 11 and an annular outer electrode 12 disposed concentrically with the inner electrode. Detector 8 has a central aperture 10 adapted to pass light beam 4 which impinges on surface 5 of the object to be measured. The light scattered or reflected by surface 5 is imaged by means of torus-shaped lens 7 as shown in a perspective view in FIG. 12, in the area extending between electrodes 11 and 12 of the active surface of position-sensitive detector 8. As already shown in FIG. 4, substrate 81 is connected to a voltage source by means of a substrate conductor 82. The electrodes 11 and 12 are connected to preamplifiers or impedance converters 18. The source of light 3 which may be a laser or a laser diode or a light-emitting diode is operated by means of a stabilizing circuit 13 so that it emits light of constant energy. If desired, the light produced by light source 3 may additionally be passed through a collimator lens 22.

Figure 15:
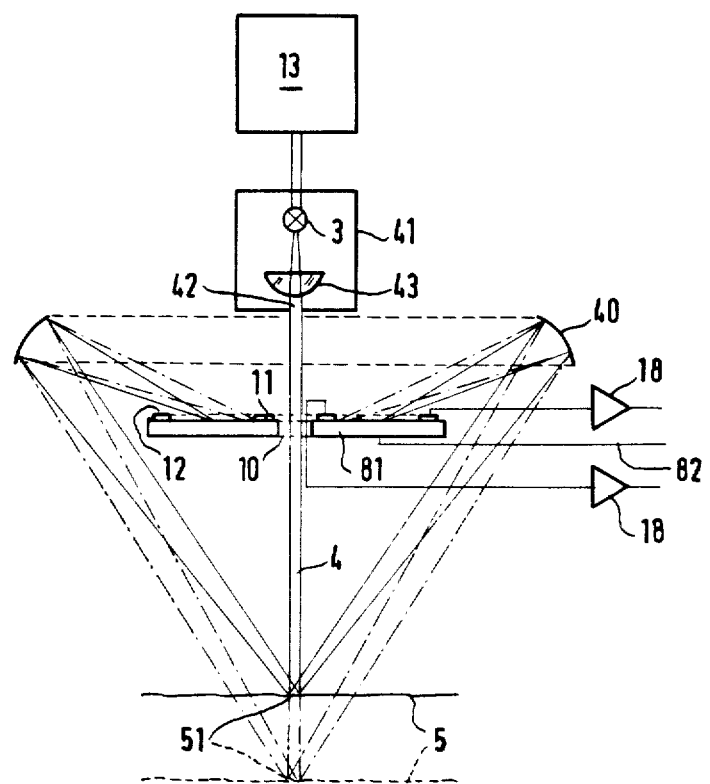
FIG. 15 shows an embodiment of the invention using a rotationally symmetrical concave mirror.

FIG. 15 shows an alternative for FIG. 9. In this case there is used, instead of a torus-shaped lens a rotationally symmetrical concave mirror in order to present the light spot reflected from surface 5 on the circular ring-shaped photodetector 8 as a narrow ring, which at a larger distance of the surface 5 from the light source 3 lies closer to the inner ring of electrodes 11 of the photodetector 8 than a smaller distance between the light source 3 and the surface 5. The light source 3 and the lens 43 are encompassed in a housing in this case having an opening 42 with the effect of an aperture, through which penetrates a small bundle of light 4. The lens is formed to be plano-convex so that the rays of light of the bundle of light 4 are parallel to the axis and present a light spot 51 on the surface 5, the diameter of which is small and independent of the distance of the light source 3. The rotationally symmetrical concave mirror 40 can be a parabolic or elliptic reflector whose production is easier under circumstances than is the production of the torus-shaped lens according to FIG. 12.

Figure 10:
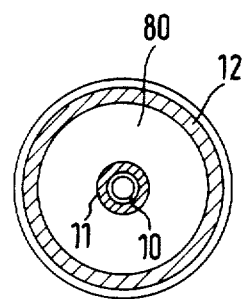
FIG. 10 is a plan view of an annular position-sensitive detector.

FIG. 10 is a plan view of a position-sensitive photodetector of the kind diagrammatically shown in cross section in FIG. 9. The photodetector has a central aperture or bore 10 adapted to allow the light beam to pass through. Bore 10 is surrounded by inner electrode 11. Extending between inner electrode 11 and the outer electrode 12 which is also of annular shape is the active surface 80 in which the implanting light produces charge carriers which are discharged via electrodes 11 and 12.

Figure 13:
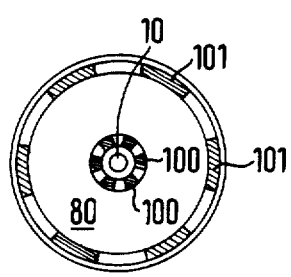
FIG. 13 shows a position-sensitive detector composed of a plurality of segments.

FIG. 13 shows another embodiment of a position-sensitive photodetector adapted for use in a device of the invention. This photodetector comprises a plurality of segments 100 and 101 arranged on two concentric circles. Segments 100 form an inner annulus, segment 101 forming an outer annulus. The two arrays of segments define the active surface 80 of the photo-sensitive detector. This photodetector, too, has a central aperture 10. The reason why the inner and the outer electrodes are subdivided into discrete segments is to be seen in the fact that in position measuring devices the light received is in most cases reflected onto the detector by a material having a bright surface. Depending on the characteristics of the surface of the object to be measured, i.e. the structure of the material, and the angle of incidence of the light beam, more light is reflected in a preferred direction than in other directions in space. In the case of an arrangement in which each detector electrode comprises a plurality of segments, with the various signals being processed individually, it is possible to compensate for this phenomenon. If desired, the individual output signals of the detector electrodes may be combined differently in order to compensate for non-uniformities in light distribution and light reflexion.

Figure 14:
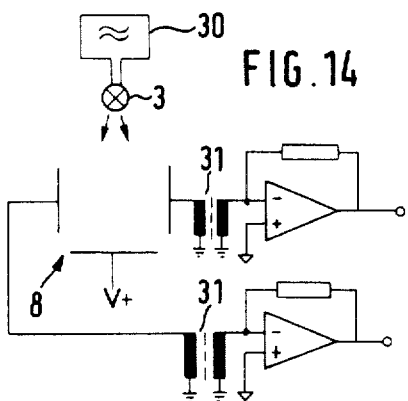
FIG. 14 shows an embodiment of the invention comprising a modulated source of light.

FIG. 14 illustrates still another embodiment of the invention in which the source of light 3 is supplied by a generator 30, the result being that the intensity of the light source is modulated. The modulated light impinges on a photodetector 8 and thus produces an output signal of modulated intensity. With the aid of transformers 31 the direct voltage level of the detector output signal is separated, and only the alternating current signal is then supplied to a signal processing circuit. In this manner it is possible to exclude all changes in background illumination which might result in a change in the level of the output signal of the photodetector. It is also possible to provide selective filters which are tuned to the modulation frequency of the light source. In this case it is also possible to distinguish light signals of fluctuating intensity from the light produced by the light source illuminating the point to be measured.

Figure 11:
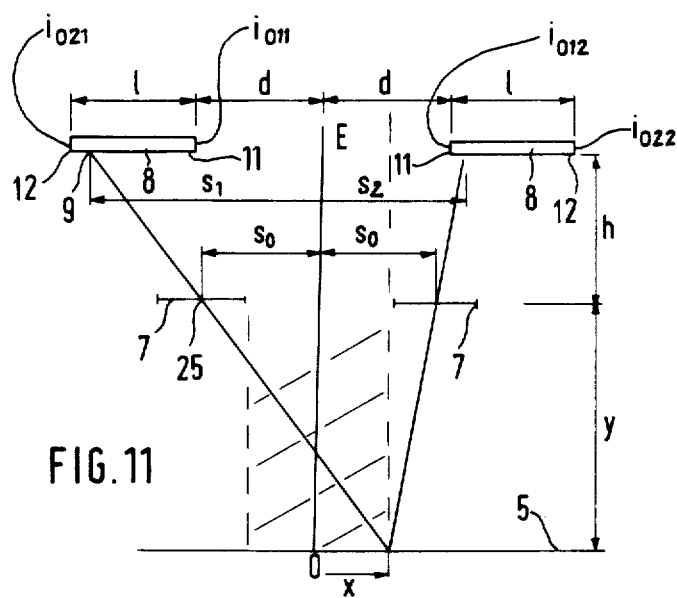
FIG. 11 is a geometrical representation of the light paths occurring in a device of the invention.

It may be shown with the aid of FIG. 11 that in a rotationally symmetrical position-sensitive detector the output signal is independent of a lateral displacement of the light source. In FIG. 11, line E-O indicates the desired axis of the incident light beam. The distance between surface 5 and the plane containing lenses 7 is shown at y. h indicates the distance between the lens plane and the active surface of detectors 8. d indicates the distance between inner electrode 11 and axis O-E; l indicates the distance between the inner electrode 11 and the outer electrode 12; $s_0$ indicates the distance between axis O-E and the torus centre line 25; $s_1$, $s_2$ indicate the distance between the illuminated spot 9 on the detector and axis O-E. The currents produced by electrodes 11 and 12 are shown in terms $i_{o11}$, $i_{o21}$, $i_{o12}$ and $i_{o22}$.

Using the above-named terms, the following equations obtain:

$$i_{o11} = k(s_1 - d) \qquad i_{o12} = k(s_2 - d)$$

$$i_{o21} = k(L - s_1 + d) \qquad i_{o22} = k(1 - s_2 + d)$$

$$i_1 = i_{o11} + i_{o12} \qquad s_1 = s_0 + \frac{h}{y}(s_0 + x)$$

$$i_2 = i_{o21} + i_{o22} \qquad s_2 = s_0 + \frac{h}{y}(s_0 - x)$$

$$e_{01} = k_1 i_1 = k_2(s_1 + s_2 - 2d)$$

$$e_{02} = k_1 i_2 = k_2(2e - s_1 - s_2 + 2d)$$

$$e_0 = \frac{e_{01} - e_{02}}{e_{01} + e_{02}} = \frac{2k_2(s_1 + s_2 - 2d - 1)}{2k_2 \cdot 1} =$$

$$k_3\left(2s_0 + \frac{2h}{y}s_0 - 2d - 1\right)$$

$$e_0 = p + \frac{g}{y},$$

with p and g representing constant quantities which are independent of x. It will be seen from the last equation that the output signal $e_o$ is independent of the displacement x of the light beam in relation to its desired axis O-E.

What is claimed is:

1. A device for determining the real or the virtual distance of a source of light from a spot illuminated on a measuring plane by said light source, comprising a photodetector consisting of a photosensitive substrate and two electrodes being arranged on top thereof, an optical imaging system imaging light reflected from the illuminated spot on the measuring plane onto the substrate at a given point, the position of said point depending on the distance to be measured, and an evaluating circuit connected to the two electrodes and the substrate and supplying an output signal, said output signal depending on the position of the imaging point between the electrodes, characterized in that the electrodes have the form of circular annuli and are disposed concentrically relative to one another, and that the optical imaging system is formed by a torus-shaped lens, the radial section through the torus body being lens-shaped so that a spot of light reflected from the illuminated spot results in an image of an approximately circular line on the substrate.

2. The device of claim 1, characterized in that the photodetector is provided with an aperture adapted to pass light emitted from the light source, said aperture being disposed within said inner electrode which has the form of a circular annulus.

3. A device for determining the real or the virtual distance of a source of light from a spot illuminated on a measuring plane by said light source, comprising a photodetector consisting of a photosensitive substrate and two electrodes being arranged on top thereof, an optical imaging system imaging light reflected from the illuminated spot on the measuring plane onto the substrate at a given point, the position of said point depending on the distance to be measured, and an evaluating circuit connected to the two electrodes and the substrate and supplying an output signal, said output signal depending on the position of the imaging point between the electrodes, characterized in that the electrodes have the form of circular annuli and are disposed concentrically relative to one another, and that the optical imaging system is formed by a concave mirror having the form of a circular annulus and being shaped such that a spot of light reflected from the illuminated spot results in an image of an approximately circular line.

4. The device of claim 3, characterized in that the photodetector is provided with an aperture adapted to pass light emitted from the light source, said aperture being disposed within said inner electrode which has the form of a circular annulus.

5. A device for determining the real or the virtual distance of a source of light from a spot illuminated on a measuring plane by said light source, comprising a photodetector consisting of a photosensitive substrate and two electrodes being arranged on top thereof, an optical imaging system imaging light reflected from the illuminated spot on the measuring plane onto the substrate at a given point, the position of said point depending on the distance to be measured, and an evaluating circuit connected to the two electrodes and the substrate and supplying an output signal, said output signal depending on the position of the imaging point between the electrodes, characterized in that the electrodes have the form of circular annuli and are disposed concentrically relative to one another, and that the optical imaging system is formed by a slit diaphragm having a narrow circular slit by means of which slit diaphragm a spot of light reflected from the illuminated spot results in an image of an approximately circular line.

6. The device of claim 5, characterized in that the photodetector is provided with an aperture adapted to pass light emitted from the light source, said aperture being disposed within said inner electrode which has the form of a circular annulus.

7. A device for determining the real or the virtual distance of a source of light from a spot illuminated on a measuring plane by said light source, comprising a photodetector consisting of a photosensitive substrate and two electrodes being arranged on top thereof, an optical imaging system imaging light reflected from the illuminated spot on the measuring plane onto the substrate at a given point, the position of said point depending on the distance to be measured, and an evaluating circuit connected to the two electrodes and the substrate and supplying an output signal, said output signal depending on the position of the imaging point between the electrodes, characterized in that the electrodes have the form of circular annuli and are disposed concentrically relative to one another, and that the optical imaging system is formed by several individual lenses which are arranged on a circle, said circle being concentric relative to the electrodes.

8. The device of claim 6, characterized in that the photodetector is provided with an aperture adapted to pass light emitted from the light source, said aperture being disposed within said inner electrode which has the form of a circular annulus.

* * * * *